US005269872A

United States Patent [19]

Ueda

[11] Patent Number: 5,269,872

[45] Date of Patent: Dec. 14, 1993

[54] IDENTITY TAG ATTACHING APPARATUS FOR WIRING CABLE

[75] Inventor: Yoshinori Ueda, Nagoya, Japan

[73] Assignee: Okuma Corporation, Japan

[21] Appl. No.: 5,054

[22] Filed: Jan. 15, 1993

[30] Foreign Application Priority Data

Jan. 16, 1992 [JP] Japan .................................. 4-026238

[51] Int. Cl.[5] .............................................. B32B 31/00

[52] U.S. Cl. .................................... 156/515; 156/251; 156/257; 156/261; 53/553

[58] Field of Search ................. 156/70, 251, 257, 261, 156/515, DIG. 23; 53/397, 399, 450, 553, 555, 582, 591

[56] References Cited

U.S. PATENT DOCUMENTS 3,035,381 5/1962 Hosso .............................. 156/515 X
4,345,415 8/1982 Järund .................................. 53/450
5,015,325 5/1991 Bennett et al. ................. 156/515 X

*Primary Examiner*—David A. Simmons
*Assistant Examiner*—Paul M. Rivard
*Attorney, Agent, or Firm*—McKeown, Edwards & Lenahan Evenson

[57] ABSTRACT

An apparatus prints the necessary attribute on an identity tag immediately before a cut wiring cable is inserted thereinto, and automatically attaching the printed identity tag to the wiring cable. An identity tag attaching apparatus attaches an identity tag which represents the attribute of a cable to the cable. The apparatus has a first feeder for feeding a first vinyl sheet having a small width and a continuous length in the longitudinal direction; a printer for printing the attribute of the cable to which the identify tag is to be attached on the first vinyl sheet; a second feeder for feeding a second vinyl sheet having a small width and a continuous length with the first vinyl tape sheet superimposed thereon; a punch for piercing the first vinyl sheet and the second vinyl tape sheet together in the shape of two straight lines having the same length along the longitudinal edges of the first and second vinyl sheets; a cable inserter for inserting the cable to which the identity tag is to be attached between the first and second vinyl sheets at the position at which the attribute has been printed; and a welding and cutting device for welding the first and second vinyl tape sheets along the respective lines which connect the respective opposing ends of the two parallel straight lines punched by the punch and for cutting the first and second vinyl tape sheets together along the outer peripheries of the welded portions.

1 Claim, 2 Drawing Sheets

IDENTITY TAG ATTACHING APPARATUS FOR WIRING CABLE

BACKGROUND OF THE INVENTION

Field of the Invention

The present invention relates to an apparatus for attaching an identity tag for displaying the attribute of a wiring cable to the wiring cable. More particularly, the present invention relates to an apparatus for attaching an identity tag for displaying the attribute of a wiring cable to the wiring cable which is preferably used in combination with an automatic wiring cable cutting machine.

Description of the Related Art

Identity tags having a tubular form, what is called, tube identity tags are generally used. In a conventional tube identity tag, the size thereof is determined in correspondence with the size of the wiring cable used, and the same number of tube identity tags as the number of wiring cables are produced in advance by a cable tube identity tag producing apparatus. Each of the tube identity tags produced is fitted over the corresponding cable from an end of the cable by a worker, as shown in FIG. 5, and thereafter the end of the cable is processed as desired.

It is therefore necessary to produce in advance cable tube identity tags in correspondence with the sizes of the respective cables, so that there is a fear of mixing the sizes and types of tube identity tags and losing them before attaching them to the cables. When the size of the cable is changed, the identity tag produced in advance is wasted. In addition, a worker must fit each identity tag over the corresponding cable by hand, which leads to high cost. In addition, the identity tag of a different type or size is sometimes attached to a cable by mistake.

SUMMARY OF THE INVENTION

Accordingly, it is an object of the present invention to eliminate the above-described problems in the related art and to provide an apparatus for printing the necessary attribute on an identity tag immediately before a cut wiring cable is inserted thereinto, and automatically attaching the printed identity tag to the wiring cable. To achieve this aim, the present invention provides an identity tag attaching apparatus for attaching an identity tag which represents the attribute of a cable to the cable, the apparatus comprising: a) a first feeding means for feeding a first vinyl sheet having a small width and a continuous length in the longitudinal direction; b) a printing means for printing the attribute of the cable to which the identity tag is to be attached on the first vinyl sheet; c) a second feeding means for feeding a second vinyl sheet having a small width and a continuous length with the first vinyl tape sheet superimposed thereon; d) a punching means for piercing the first vinyl sheet and the second vinyl tape sheet together in the shape of two straight lines having the same length along the longitudinal edges of the first and second vinyl sheets; e) a cable inserting means for inserting the cable to which the identity tag is to be attached between the first and second vinyl sheets at the position at which the attribute has been printed; and f) welding and cutting means for welding the first and second vinyl tape sheets along the respective lines which connect the respective opposing ends of the two parallel straight lines punched by the punching means and for cutting the first and second vinyl tape sheets together along the outer peripheries of the welded portions.

According to this apparatus, since an identity tag is automatically attached to a cut wiring cable, the operation is accurate and efficient. Since no manual work is required, the manufacturing cost is lowered. Printing of the attribute of the wire immediately before attaching the identity tag prevents errors and saves waste. In addition, the identity tag is produced by laying flat vinyl sheets with one on top of the other, so that the identity tag can cope with various types and sizes of wiring cables.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
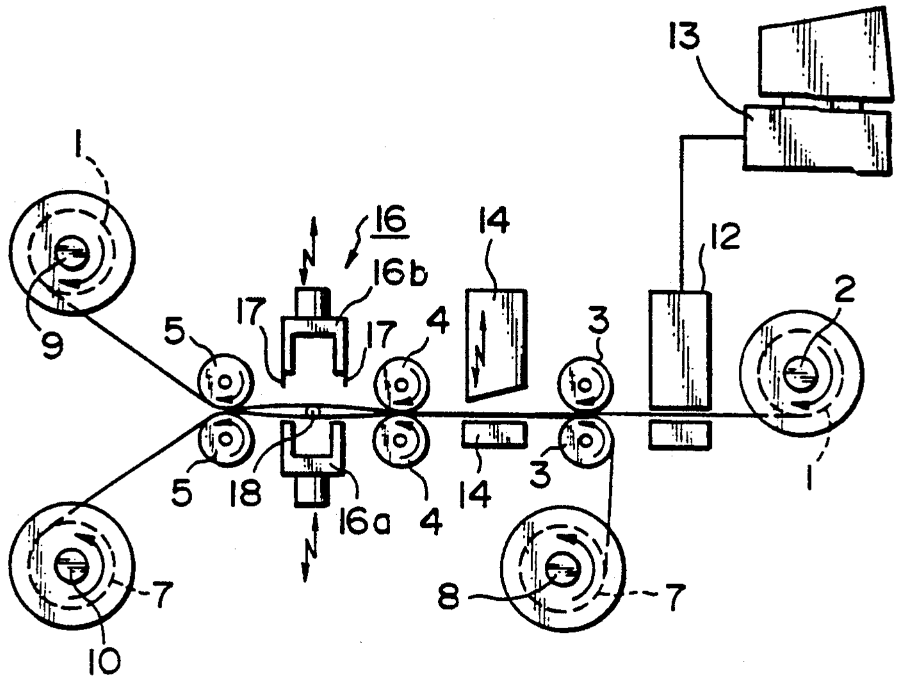
FIG. 1 is an explanatory view of an identity tag attaching apparatus according to the present invention.

A preferred embodiment of the present invention will now be explained with reference to FIGS. 1 and 2.

A rolled vinyl sheet 1 for an identity tag is rotatably supported by a spindle 2, and a braking device is provided so as to draw the vinyl sheet 1 without slack. The vinyl sheet 1 is intermittently fed by a predetermined length by pairs of upper and lower feed rollers 3 and 4, and clamped between clamping rollers 5. The feed rollers 3 and 4 are simultaneously driven and controlled by a motor. The clamping rollers 5 are supported in such a manner as to be simultaneously movable in the opposite directions by the same amount.

Another vinyl sheet 7 is rolled and rotatably supported by a spindle 8 under the feed rollers 3 in the same way as the vinyl sheet 1. The vinyl sheet 7 is fed beneath the vinyl sheet 1 such that the vinyl sheet 1 is superimposed on the vinyl sheet 7. When the vinyl sheets 1 and 7 are passed between the clamping rollers 5, the vinyl sheet 1 is rolled round a spindle 9 which is driven by a motor, while the vinyl sheet 7 is rolled round a spindle 10 which is simultaneously rotated with the feed rollers 3 and 4. A weak torque is applied to the spindles 9 and 10 in the direction of rolling so that the sheet 1 (7) does not become slack. As a result, slight withdrawal of the sheet 1(7) is tolerated.

A heat transfer head unit 12 is disposed between the spindle 2 and the feed rollers 3 in this continuous sheet feeding device. The heat transfer head unit 12 prints the numerals of the desired size of a wiring cable, which are set by a personal computer 13, on the vinyl sheet 1.

A punching unit 14 is disposed between the feed rollers 3 and 4. The punching unit 14 punches together the vinyl sheets 1 and 7 which are laid on top of each other while the feed rollers 3 and 4 are stopped.

A heat welding and cutting head unit 16 is disposed between the feed rollers 4 and the clamping rollers 5. A heater is incorporated into both a lower table 16a and an upper table 16b of the heat welding and cutting unit 16. The lower table 16a and the upper table 16b can simultaneously feed the vinyl sheets 1 and 7 in the opposite directions which are orthogonal to the direction of feeding the vinyl sheets 1, 7 with the punched portions opposed to each other. A pair of blades 17 having a length approximately equal to the interval between the two parallel straight lines which have been punched by the punching unit 14 is provided on the upper table 16b in parallel with the two lines connecting the respective opposing ends of the two parallel straight lines punched by the punching unit 14. The superimposed vinyl sheets 1 and 7 are welded along the two lines connecting the respective opposing ends of the two parallel lines which have been punched by the punching unit 14, and cutting is executed simultaneously with welding. Each of the blades 17 is inclined so that the vinyl sheets 1 and 7 are gradually cut and the cutting operation is finished simultaneously with welding. A wiring cable 18 which is cut by a cable cutter (not shown) is automatically or manually inserted into the heat welding and cutting head unit 16 between the welded portions. The heat transfer head unit 12, the punching unit 14 and the heat welding and cutting head unit 16 are equidistantly spaced from each other with respect to the corresponding centers.

The operation of the apparatus having the above-described structure will now be explained.

Figure 2:
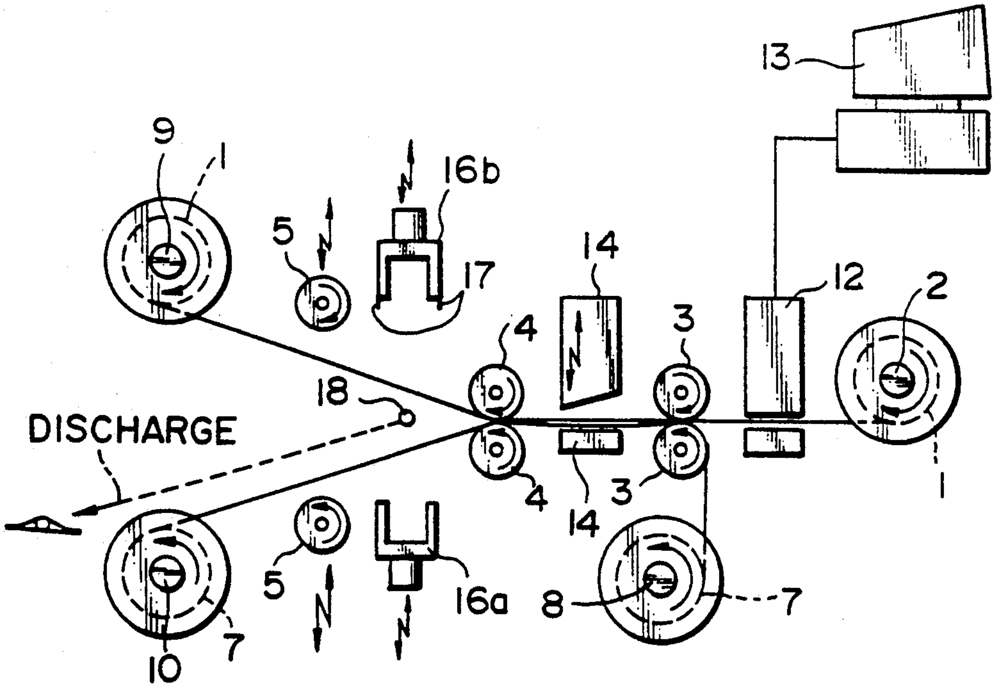
FIG. 2 shows the identity tag attaching apparatus shown in FIG. 1 in the state of attaching the identity tag to a wiring cable.
Figure 3:
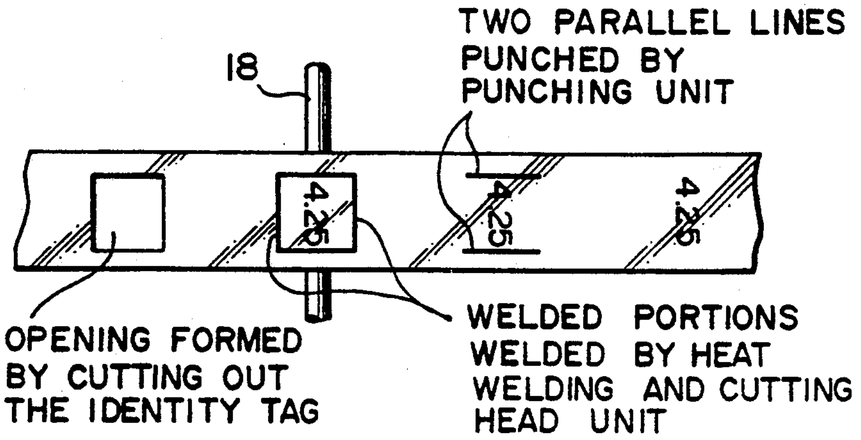
FIG. 3 shows a vinyl sheet for the identity tag in the process of printing, punching and cutting.

It is now assumed that the identity tag attaching apparatus assumes the state shown in FIG. 2. If the number of a wiring cable is determined to be 4.25, the personal computer 13 supplies the necessary information, namely, the numerals 4.25 to the heat transfer head unit 12, and while each pair of rollers 3 and 4 is suspended, the heat transfer head unit 12 prints "4.25" on the upper surface of the vinyl sheet 1 for an identity tag, as shown in FIG. 3. After printing, the driving motors again rotate the rollers 3, 4 and the spindles 9, 10, respectively, so as to feed the superimposed sheets 1 and 7 by one pitch. The printed surface is thereby situated at the center of the punching unit 14 with a puncher waiting at the upper portion. The puncher is then lowered so as to punch the vinyl sheets 1 and 7 in the shape of two straight lines having the same length with the numerals 4.25 sandwiched therebetween in parallel with the longitudinal edges of the vinyl sheets, as shown in FIG. 3. After elevating the puncher, the driving motors again rotates the rollers 3, 4 and the spindles 9, 10 so as to feed the superimposed sheets 1 and 7 by another pitch. The punched and printed surface is thereby situated at the center of the heat welding and cutting head unit 16.

Figure 4:
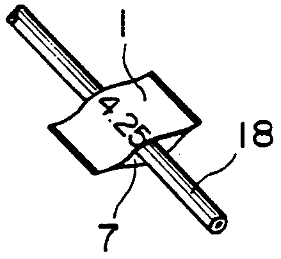
FIG. 4 shows the identity tag attached to the cut wiring cable.
Figure 5:
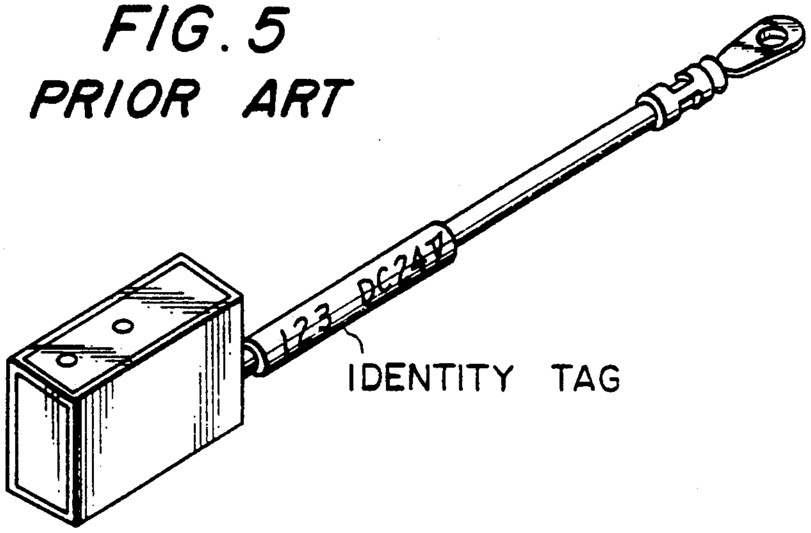
FIG. 5 PRIOR ART
FIG. 5 shows a conventional identity tag attached to a wiring cable.

The vinyl sheets 1 and 7 are opened by the torque applied to the spindles 9 and 10 in the direction of rolling, as shown in FIG. 2, and the end of the cable 18 is inserted between the sheets 1 and 7. The clamping rolls 5 then come nearer to each other so as to clamp the superimposed sheets 1, 7. The lower table 16b and the upper table 16a come nearer to each other, and the sheets 1, 7 are gradually cut by the blades 17. Immediately before the final cutting, the superimposed vinyl sheets 1 and 7 are welded along the two lines connecting the opposing ends of the two parallel lines which have been punched by the punching unit 14, as shown in FIG. 3, and the vinyl sheets 1, 7 are cut at the outer peripheries of the welded portions. The clamping rollers 5 are vertically separated and the vinyl sheets 1, 7 are opened. At this time, the identity tag which is cut from the sheets 1, 7 is discharged in the state of being fitted over the end portion of the cable 18, as shown in FIG. 4. The remaining continuous vinyl sheets 1 and 7 with openings formed by cutting the identity tag therefrom are then fed by another pitch and rolled around the spindles 9 and 10, respectively. In the above explanation, only one identity tag is produced, but actually each step is continuously executed, and the wire with the identity tag attached thereto is discharged at every pitch.

The present invention having the above-described structure produces the following advantages.

Since an identity tag is automatically attached to a cut wiring cable, the operation is accurate and efficient. Since no manual work is required, the manufacturing cost is lowered. Printing of the attribute of the wire immediately before attaching the identity tag prevents errors and saves waste. In addition, the identity tag is produced by laying flat vinyl sheets on top of each other, so that the identity tag can cope with various types and sizes of wiring cables.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An identity tag attaching apparatus for attaching an identity tag which represents the attribute of a cable to said cable, said apparatus comprising:

a) a first feeding means for feeding a first vinyl sheet having a small width and a continuous length in the longitudinal direction;

b) a printing means for printing the attribute of said cable to which said identity tag is to be attached on said first vinyl sheet;

c) a second feeding means for feeding a second vinyl sheet having a small width and a continuous length with said first vinyl tape sheet superimposed thereon;

d) a punching means for piercing said first vinyl sheet and said second vinyl tape sheet together in the shape of two straight lines having the same length along the longitudinal edges of said first and second vinyl sheets;

e) a cable inserting means for inserting said cable to which said identity tag is to be attached between said first and second vinyl sheets at the position at which said attribute has been printed; and f) welding and cutting means for welding said first and second vinyl sheets along the respective lines which connect the respective opposing ends of said two parallel straight lines punched by said punching means and for cutting said first and second vinyl sheets together along the outer peripheries of the welded portions.

* * * * *